US008820712B2

(12) United States Patent
Miura et al.

(10) Patent No.: US 8,820,712 B2
(45) Date of Patent: Sep. 2, 2014

(54) OPENING AND CLOSING VALVE FOR HIGH-PRESSURE GAS

(75) Inventors: Taneaki Miura, Saitama (JP); Hiroyasu Ozaki, Utsunomiya (JP); Koichi Takaku, Shioya-gun (JP); Koichi Kato, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 141 days.

(21) Appl. No.: 13/432,552

(22) Filed: Mar. 28, 2012

(65) Prior Publication Data

US 2012/0248365 A1 Oct. 4, 2012

(30) Foreign Application Priority Data

Mar. 30, 2011 (JP) ................................. 2011-074823

(51) Int. Cl.
| | |
|---|---|
| *F16K 1/42* | (2006.01) |
| *F16K 1/38* | (2006.01) |
| *F16K 39/02* | (2006.01) |
| *F16K 31/06* | (2006.01) |
| *F16K 25/00* | (2006.01) |

(52) U.S. Cl.
CPC ............ *F16K 31/0655* (2013.01); *F16K 1/38* (2013.01); *F16K 39/024* (2013.01); *F16K 25/005* (2013.01); *F16K 1/42* (2013.01); *Y10S 251/903* (2013.01)
USPC .............................. 251/333; 251/368; 251/903

(58) Field of Classification Search
USPC .................................. 251/333–334, 368, 903
See application file for complete search history.

(56) References Cited

U.S. PATENT DOCUMENTS

| | | | | |
|---|---|---|---|---|
| 2,953,347 | A | * | 9/1960 | Phillips .......................... 251/361 |
| 3,086,750 | A | * | 4/1963 | Carlson et al. ................. 251/358 |
| 3,090,596 | A | * | 5/1963 | Gifford .......................... 251/333 |
| 3,155,367 | A | * | 11/1964 | Gifford .......................... 251/357 |
| 3,232,314 | A | * | 2/1966 | Koester ......................... 251/334 |
| 3,236,496 | A | * | 2/1966 | Rosenstein et al. ........... 251/357 |
| 3,445,089 | A | | 5/1969 | Murray et al. |
| 4,196,886 | A | | 4/1980 | Murray |

(Continued)

FOREIGN PATENT DOCUMENTS

| | | |
|---|---|---|
| DE | 102005033191 A1 | 2/2006 |
| JP | H3-28370 U | 3/1991 |

(Continued)

OTHER PUBLICATIONS

Japanese Office Action application No. 2011-074823 dated Dec. 21, 2012.

(Continued)

*Primary Examiner* — John Bastianelli
(74) *Attorney, Agent, or Firm* — Squire Patton Boggs (US) LLP (57) ABSTRACT

A pilot valve is provided with a conical first contact surface, and a pilot valve seat is provided with an annular second contact surface of which an initial contact portion with respect to the first contact surface has a circular-arc cross-section. The first contact surface is formed of a resin with elasticity, and the second contact surface is formed of metal. When a pressure-contact load is small, the first contact surface and the second contact surface come into line-contact with each other. When a pressure-contact load increases, the first contact surface and the second contact surface come into plane-contact with each other.

4 Claims, 10 Drawing Sheets

(56) References Cited

U.S. PATENT DOCUMENTS

| | | | |
|---|---|---|---|
| 4,368,755 A * | 1/1983 | King | 251/334 |
| 4,497,298 A * | 2/1985 | Ament | 251/368 |
| 4,525,910 A * | 7/1985 | Boehmer | 251/903 |
| 4,953,826 A * | 9/1990 | Ohmi et al. | 251/368 |
| 6,089,843 A * | 7/2000 | Kondoh | 251/368 |
| 2009/0101858 A1* | 4/2009 | Pechtold | 251/333 |

FOREIGN PATENT DOCUMENTS

| | | |
|---|---|---|
| JP | 08-159304 A | 6/1996 |
| JP | 2000-346497 A | 12/2000 |
| JP | 2005-023975 A | 1/2005 |
| JP | 2005-265104 A | 9/2005 |
| JP | 2009-144830 A | 7/2009 |
| JP | 4330943 B | 9/2009 |
| WO | 99/61794 A1 | 12/1999 |

OTHER PUBLICATIONS

German Office Action application No. 10 2012 204 922.3 dated Sep. 17, 2012.
German Search Report application No. 10 2012 204 922.3 dated Sep. 17, 2012.
Chinese Office Action with English language translation, dated Jan. 8, 2014, for corresponding Chinese Application No. 201210085119.4.

* cited by examiner

OPENING AND CLOSING VALVE FOR HIGH-PRESSURE GAS

CROSS-REFERENCE TO RELATED APPLICATION

Priority is claimed on Japanese Patent Application No. 2011-074823, filed Mar. 30, 2011, the disclosure of which is hereby incorporated herein by reference in its entirety.

BACKGROUND OF THE INVENTION

1. Field of the Invention

The present invention relates to an opening and closing valve for high-pressure gas which is used as a passageway handling a high-pressure gas and opens and closes the passageway by causing a valve body and a valve seat to come into contact with or separate from each other.

2. Description of Related Art

In a system which handles a high-pressure gas such as a fuel cell or a compressed natural gas (CNG), an opening and closing valve is used for various valves such as a stop valve. The opening and closing valve which is used for such a purpose is required to have a high sealing performance (an isolating performance) between a valve body and a valve seat and have durability for long-term use. Accordingly, it is important to satisfy both requirements to a high level.

Therefore, as an opening and closing valve for high-pressure gas which satisfies such requirements, an opening and closing valve for high-pressure gas is proposed in which a contact surface in a valve body is formed in a conical shape, a contact surface in a valve seat is formed as a tapered shape accommodating the valve body side contact surface, one of the valve body and the valve seat is formed of metal, and the other thereof is formed of a resin (for example, see Japanese Patent No. 4330943).

SUMMARY OF THE INVENTION

However, in the opening and closing valve for high-pressure gas of the related art, the contact surfaces of the valve body and the valve seat normally come into plane-contact with each other. Accordingly, when both pressure-contact loads are high when closing the valve, the valve may be reliably closed and high durability may be obtained. However, when both pressure-contact loads are small, it is difficult to maintain the sealing performance (the isolating performance) between the valve body and the valve seat.

Therefore, it is an object of the invention to provide an opening and closing valve for high-pressure gas capable of maintaining a sealing performance even when a pressure-contact load between a valve body and a valve seat is small and maintaining high durability of the valve body and the valve seat even when a large pressure-contact load acts thereon.

Some aspects of the invention adopt the following means in order to solve the above-described problems.

(A) According to an aspect of the invention, an opening and closing valve for high-pressure gas is provided that opens and closes a passageway by causing a valve body and a valve seat, which are coaxially disposed, to come into contact with or separate from each other, wherein one of the valve body and the valve seat includes a conical first contact surface, and the other thereof includes an annular second contact surface of which an initial contact portion with respect to the first contact surface has a circular-arc cross-section, and wherein one of the first contact surface and the second contact surface is formed of a resin, and the other thereof is formed of metal.

Accordingly, when the pressure-contact load of the valve body with respect to the valve seat is small, the valve body and the valve seat come into line-contact with each other at the conical first contact surface and the circular-arc cross-section portion of the second contact surface, and when the pressure-contact load of the valve body with respect to the valve seat increases, the first contact surface and the second contact surface come into plane-contact with each other by the deformation of the resin.

(B) In the aspect of (A), when the valve body and the valve seat come into contact with each other, an area from the contact area to the valve body may be connected to the first gas passageway, and an area from the contact area to the valve seat may be connected to the second gas passageway.

Accordingly, when the valve body and the valve seat separate from or come into contact with each other, the gap between the first gas passageway and the second gas passageway is opened and closed.

(C) In the aspect of (A) or (B), the resin may be polyamide-imide.

Accordingly, the resin which is used in one of the first contact surface and the second contact surface may be elastically deformable and have high strength.

As described above, according to the aspect of the invention, when the pressure-contact load of the valve body and the valve seat is small, the conical first contact surface and the circular-arc cross-section portion of the second contact surface come into line-contact with each other. When the pressure-contact load of the valve body and the valve seat increases, the first contact surface and the second contact surface come into plane-contact with each other by the deformation of the resin. Accordingly, it is possible to reliably maintain the sealing performance when the pressure-contact load between the valve body and the valve seat is small and maintain high durability of the valve body and the valve seat even when a large pressure-contact load acts thereon.

DETAILED DESCRIPTION OF THE INVENTION

Hereinafter, exemplary embodiments of the invention will be described by referring to the drawings.

First, a first embodiment which is shown in FIGS. 1 to 6 will be described.

Figure 1:
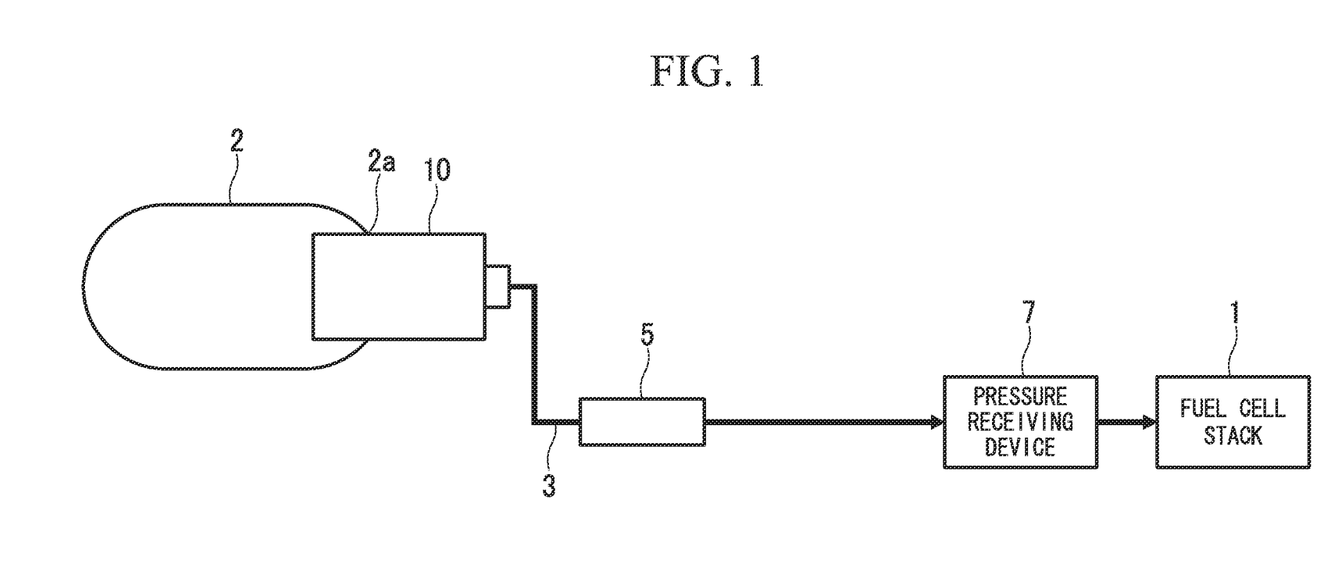
FIG. 1 is a schematic configuration diagram illustrating a fuel cell system which adopts an opening and closing valve for high-pressure gas as an embodiment according to the invention.

FIG. 1 is a schematic configuration diagram illustrating a fuel cell system, where reference numeral 1 denotes a fuel cell stack (a fuel cell) which generates electric power by receiving hydrogen as fuel and oxygen as an oxidizing agent. The fuel cell stack 1 is, for example, a polymer electrode fuel cell (PEFC), and is formed by stacking plural cells each of which is formed by sandwiching a membrane electrode assembly (MEA) using separators (not shown).

A hydrogen gas of a predetermined pressure and a predetermined flow rate is supplied from a hydrogen tank 2 (a high-pressure fluid supply source) storing high-pressure hydrogen to the fuel cell stack 1 through a hydrogen supply passageway 3, and air of a predetermined pressure and a predetermined flow rate is supplied to the fuel cell stack 1 through an air supply device (not shown).

The hydrogen tank 2 is formed in a cylindrical shape of which both ends in the longitudinal direction are formed in a substantially semi-spherical shape and one end in the longitudinal direction is opened. A main stop valve (an opening and closing valve for high-pressure gas) 10 which enables and disables the supply of a gas with respect to the hydrogen supply passageway 3 from the hydrogen tank 2 is attached to an opening portion 2a.

A pressure reducing valve (an opening and closing valve for high-pressure gas) 5 and a pressure receiving device 7 are installed in the hydrogen supply passageway 3. A hydrogen gas of a high pressure (for example, 35 MPa, 70 MPa, or the like) which is discharged from the hydrogen tank 2 is depressurized to a predetermined pressure (for example, 1 MPa or less) by a pressure reducing valve 5 and is supplied to the pressure receiving device 7.

Here, the pressure receiving device 7 generally corresponds to a device which is disposed between the pressure reducing valve 5 and the fuel cell stack 1, and includes an ejector, an injector, a humidifier, and the like. The ejector is a device which returns a hydrogen off-gas to the hydrogen supply passageway 3 so as to use the hydrogen off-gas discharged from the fuel cell stack 1 in a circulating manner. The injector is a device which adjusts a flow rate of a hydrogen gas supplied to the fuel cell stack 1. The humidifier is a device which humidifies a hydrogen gas supplied to the fuel cell stack 1. Which device will be assembled as the pressure receiving device 7 is determined by the overall configuration of the fuel cell system.

In the first embodiment, the opening and closing valve for high-pressure gas according to the invention is applied to a main stop valve 10 of the fuel cell system.

Figure 2:
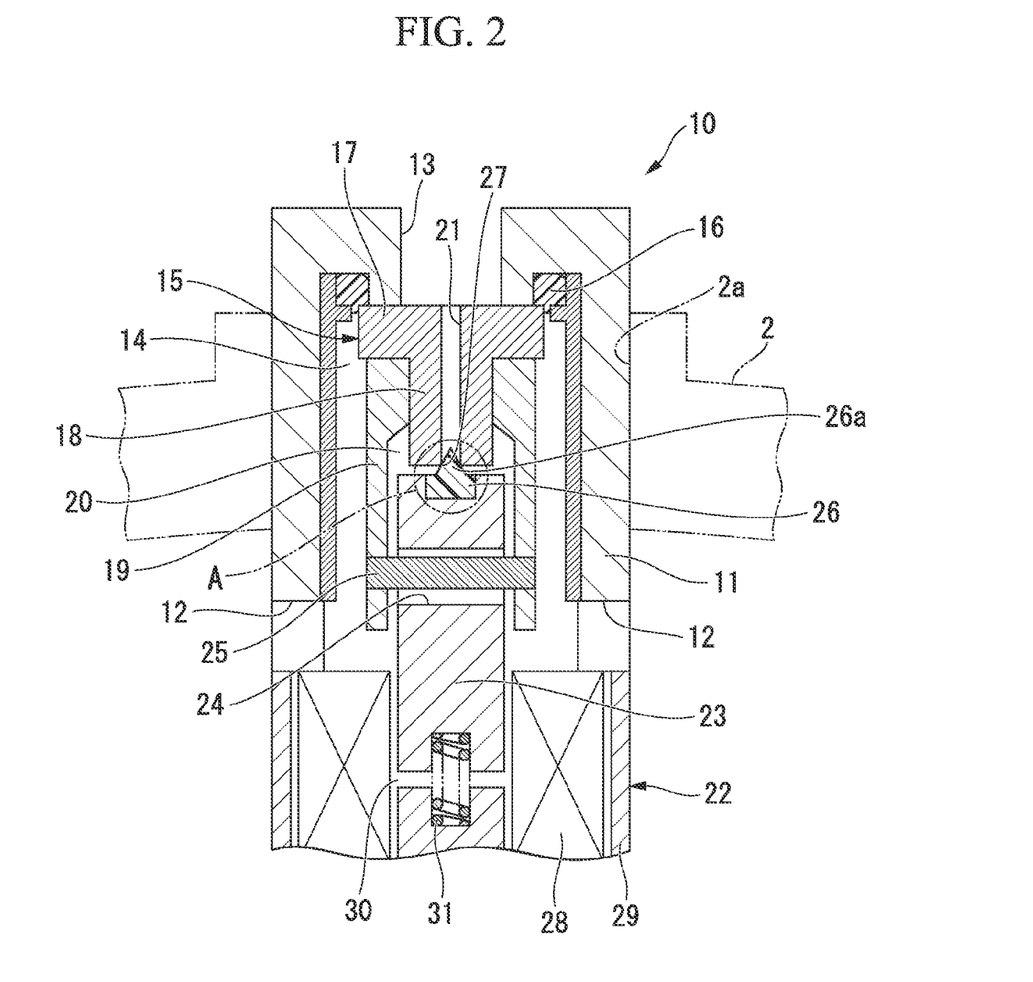
FIG. 2 is a longitudinal cross-sectional view illustrating a stop valve according to a first embodiment of the invention.
Figure 3:
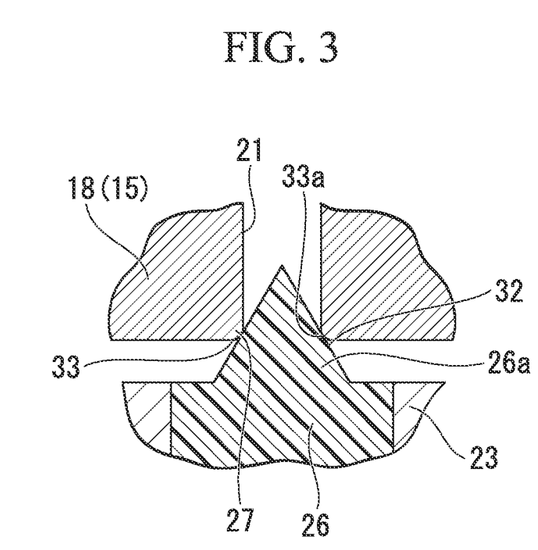
FIG. 3 is an enlarged cross-sectional view corresponding to a part A of FIG. 2.
Figure 4:
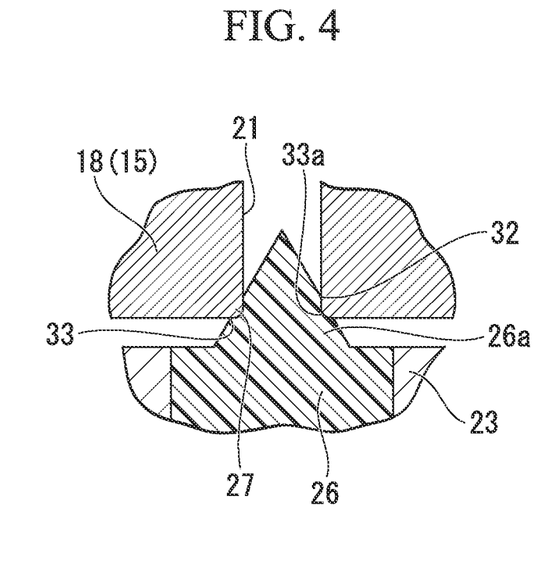
FIG. 4 is an enlarged cross-sectional view corresponding to the part A of FIG. 2.

FIG. 2 is a diagram illustrating a detailed structure of the main stop valve 10, and FIGS. 3 and 4 are enlarged diagrams illustrating a portion corresponding to a part A of FIG. 2.

Figure 5:
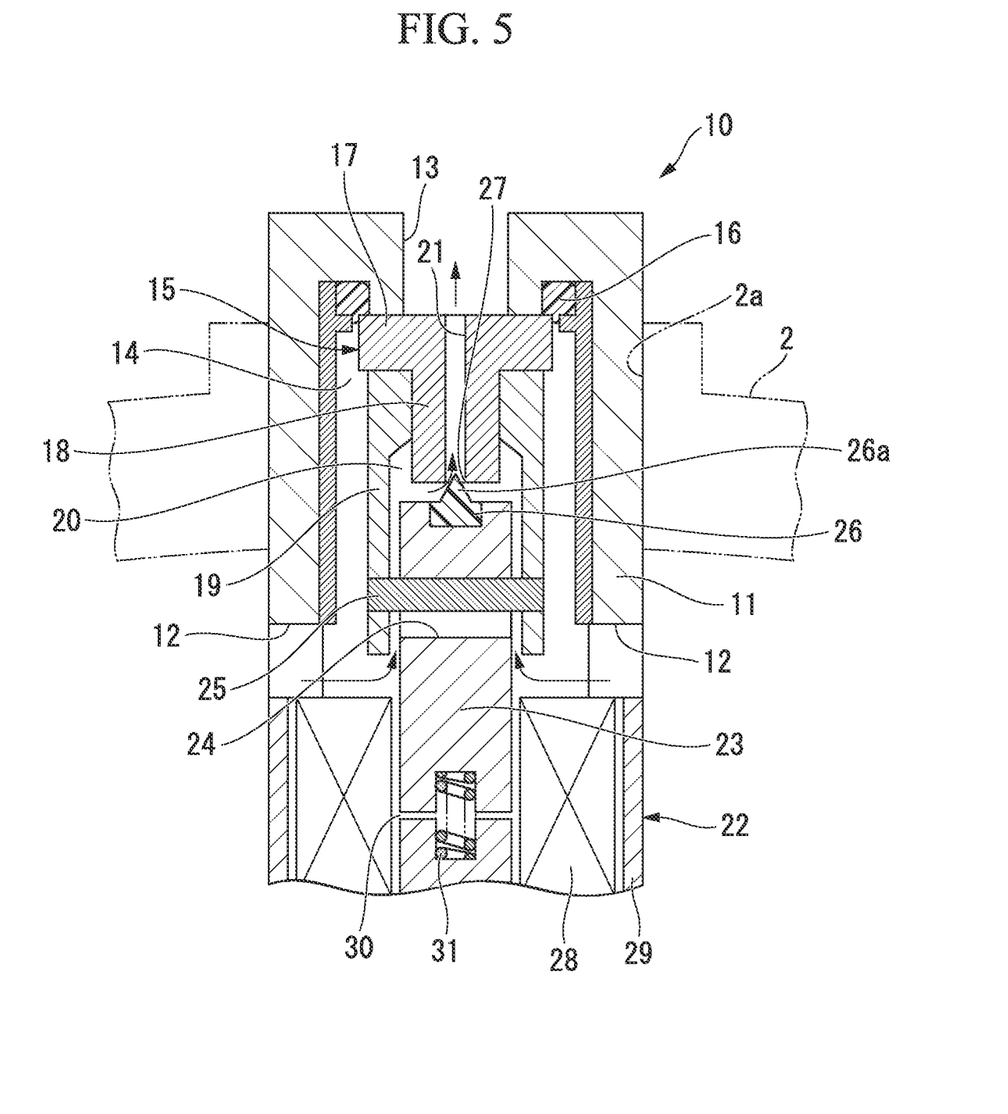
FIG. 5 is a longitudinal cross-sectional view illustrating the stop valve according to the first embodiment of the invention.
Figure 6:
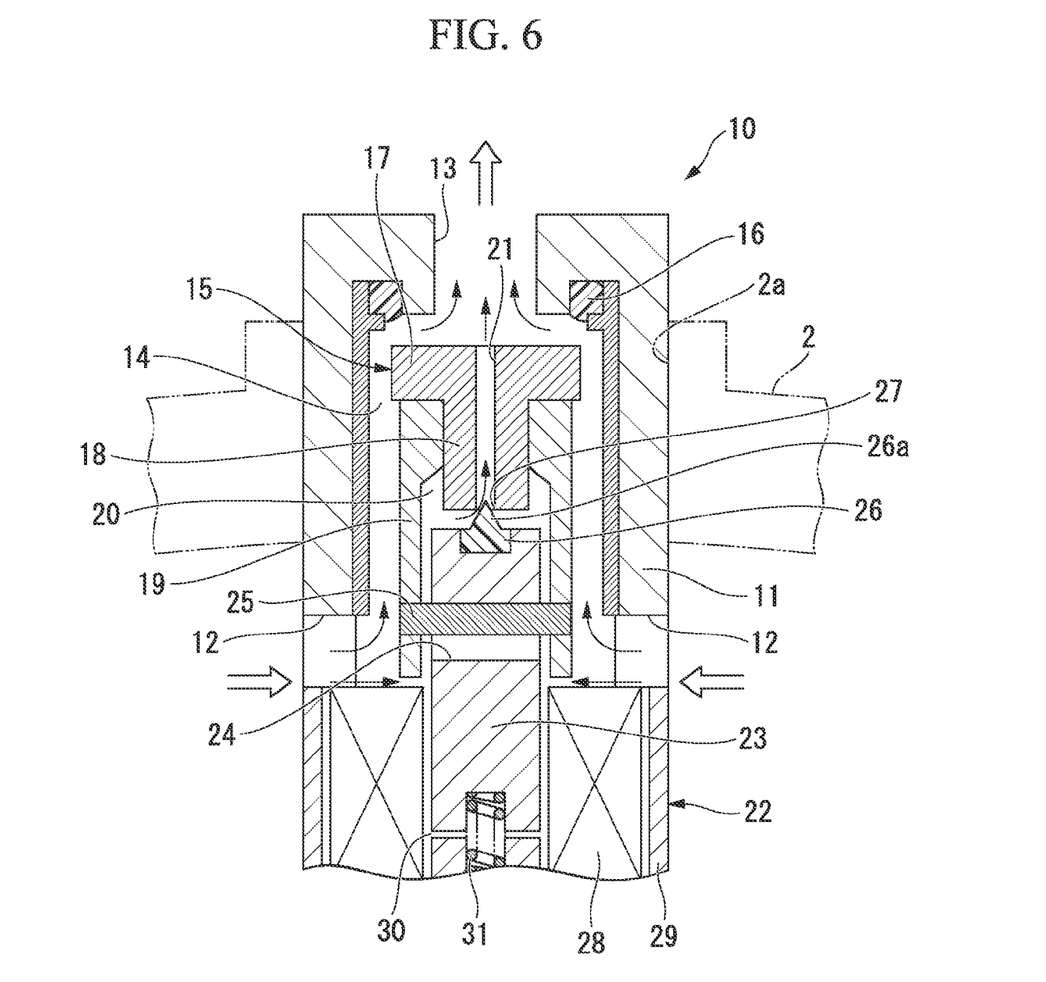
FIG. 6 is a longitudinal cross-sectional view illustrating the stop valve according to the first embodiment of the invention.

Further, FIGS. 5 and 6 are diagrams illustrating the operation state of the main stop valve 10.

The main stop valve 10 is formed as a pilot-type electromagnetic valve, and as shown in FIG. 2, a valve body 11 is attached to the opening portion 2a of the hydrogen tank 2 so as to also serve as a sealing plug. The valve body 11 is provided with an introduction path 12 (a first gas passageway) which is connected to the inside of the hydrogen tank 2, and a discharge path 13 (a second gas passageway) which is connected to the hydrogen supply path 3 outside the hydrogen tank 2. Further, a valve accommodating chamber 14 is provided between the introduction path 12 and the discharge path 13 inside the valve body 11, and a main valve 15 which opens and closes the end portion of the discharge path 13 is accommodated inside the valve accommodating chamber 14 so as to be movable in a reciprocating manner. The introduction path 12 is formed by perforating the outer peripheral wall of one end side (for example, the lower end side of the drawing) of the valve accommodating chamber 14 (the valve body 11) in the radial direction (for example, the transverse direction of the drawing), and the discharge path 13 is formed by perforating the end wall of the other end side (for example, the upper end side of the drawing) of the valve accommodating chamber 14 (the valve body 11) in the axial direction (for example, the vertical direction of the drawing).

The main valve 15 includes: a valve head portion 17 which comes into contact with or becomes separate from the main valve seat 16 provided in the end wall of the valve accommodating chamber 14; a shaft portion 18 which extends in the axial direction from the rear side of the valve head portion 17; and a guide cylinder portion 19 which surrounds the circumferential area of the shaft portion 18 and extends in the direction opposite to the valve head portion 17 (the same direction as that of the shaft portion 18). Furthermore, the main valve seat 16 protrudes from the end wall so as to surround the circumferential area of the end portion of the discharge path 13.

The guide cylinder portion 19 forms a concave space 20 therein together with the shaft portion 18, and the concave space 20 is normally connected to the introduction path 12 of the valve body 11. A pilot hole 21 which communicates with the concave space 20 and the discharge path 13 is formed at the axis position of the valve head portion 17 and the shaft portion 18.

Further, a plunger 23 of a driving unit 22 to be described later is disposed inside the guide cylinder portion 19 so as to be displaceable in a reciprocating manner. The plunger 23 is provided with an elongated hole 24 which is perforated in the radial direction, and a connection pin 25 which is coupled to the opposite wall of the guide cylinder portion 19 is inserted into the elongated hole 24. That is, the main valve 15 (the guide cylinder portion 19) and the plunger 23 are connected to each other by the connection pin 25 with a slight axial allowance in the elongated hole 24.

A pilot valve 26 (a valve body) which includes a valve head portion 26a is attached to the end surface of the plunger 23 disposed inside the concave space 20. The pilot valve 26 is disposed so as to be coaxial with the pilot hole 21 of the main valve 15, and the edge which is disposed in the concave space 20 of the pilot hole 21 is formed as a pilot valve seat 27 (a valve seat) which comes into contact with or becomes separate from the pilot valve 26. The pilot valve 26 and the pilot valve seat 27 will be described later in detail.

The driving unit 22 is used to open and close the pilot valve 26 and the main valve 15. A concave portion 30 is provided at the axis position inside a casing 29 which accommodates an electromagnetic coil 28. The plunger 23 which is formed of a magnetic material is accommodated inside the concave portion 30 so as to be movable in a reciprocating manner. The concave portion 30 is opened toward the guide cylinder portion 19 of the main valve 15, and is disposed so as to be coaxial with the guide cylinder portion 19. A spring 31 which is a biasing member is interposed between the concave portion 30 and the plunger 23, and the plunger 23 is normally biased toward the shaft portion 18 of the main valve 15 by the biasing force of the spring 31.

In the case of the main stop valve 10, in a state where the electromagnetic coil 28 is not magnetized, the plunger 23 receives the biasing force of the spring 31, the valve head portion 26a of the pilot valve 26 comes into contact with the pilot valve seat 27 of the main valve 15, and the valve head portion 17 of the main valve 15 comes into contact with the main valve seat 16 of the valve body 11. Accordingly, at this time, since the discharge path 13 of the valve body 11 is closed by the main valve 15 in a state where the pilot hole 21 of the main valve 15 is closed by the pilot valve 26, the discharge path 13 is interrupted with respect to the inside (the introduction path 12) of the hydrogen tank 2.

Further, when the electromagnetic coil 28 is magnetized from this state, the plunger 23 receives a thrust force from the electromagnetic coil 28 against the biasing force of the spring 31, and then as shown in FIG. 5, the pilot valve 26 of the end portion of the plunger 23 separates from the pilot valve seat 27 of the main valve 15. Accordingly, the pilot hole 21 of the main valve 15 is opened, so that a small amount of a hydrogen gas inside the hydrogen tank 2 is discharged to the discharge path 13 through the pilot hole 21. As a result, a difference in the pressure acting on the front and rear sides (the upper and lower sides of the drawing) of the main valve 15 becomes small.

Then, when the electromagnetic coil 28 is magnetized from this state, as shown in FIG. 6, the end portion of the elongated hole 24 of the plunger 23 comes into contact with the connection pin 25, and the main valve 15 is displaced together with the plunger 23 through the connection pin 25. Accordingly, the discharge path 13 is opened by the main valve 15, so that a large amount of a hydrogen gas is discharged from the introduction path 12 to the discharge path 13.

Incidentally, the pilot valve 26 among the main stop valve 10 is formed of a resin with elasticity, and as magnified in FIGS. 3 and 4, the valve head portion 26a is formed so as to protrude in a conical shape. The conical surface of the valve head portion 26a forms a first contact surface 32. It is desirable that the resin which forms the first contact surface 32 have elasticity and high durability with respect to a pressure-contact load. For example, polyamide-imide or the like is used.

On the other hand, the pilot valve seat 27 which is provided in the shaft portion 18 of the main valve 15 is formed of metal. In the pilot valve seat 27, as shown in FIGS. 3 and 4, the core of the end portion of the pilot hole 21 is chamfered in a circular-arc shape along the circumferential direction, and the portion is formed as a circular-arc cross-section 33a. In the case of the embodiment, the portion of the circular-arc cross-section 33a and the inner and outer edge portions are formed as a second contact surface 33.

When the second contact surface 33 first comes into contact with the first contact surface 32 on the side of the pilot valve 26, as shown in FIG. 3, the portion of the circular-arc cross-section 33a comes into line-contact with the first contact surface 32. When the pressure-contact load increases from this state, as shown in FIG. 4, the circular-arc cross-section 33a comes into plane contact with the first contact surface 32 by the elastic deformation about the portion of the circular-arc cross-section 33a on the side of the second contact surface 33 of the first contact surface 32 formed of a resin. At this time, the valve head portion 26a of the pilot valve 26 increases a contact area with respect to the pilot valve seat 27 so as to be inserted into the pilot hole 21.

Here, it is advantageous that the circular-arc cross-section 33a of the second contact surface 33 have the smaller curvature radius in order to maintain a sealing performance between the pilot valve 26 and the pilot valve seat 27 even in a small pressure-contact load. However, it is desirable that the respective portions of the pilot valve 26 and the pilot valve seat 27 be set according to the following ranges based on the balance with respect to the durability of the first contact surface 32 formed of a resin.

For example,

Diameter of pilot hole 21→0.2 mm to 0.5 mm

Conical angle of valve head portion 26a of pilot valve 26→60° to 120°

Curvature radius of circular-arc cross-section 33a→0.1 mm to 0.5 mm

As described above, in the main stop valve 10 of the embodiment, the conical first contact surface 32 which is formed of a resin with elasticity is provided in the valve head portion 26a of the pilot valve 26, and the second contact surface which is formed of metal and has a circular-arc cross-section is provided in the pilot valve seat 27. Accordingly, in a state where the pressure-contact load between the pilot valve 26 and the pilot valve seat 27 is small, the first contact surface 32 comes into line-contact with the portion of the circular-arc cross-section 33a of the second contact surface 33, so that the sealing performance may be maintained. Further, when the pressure-contact load between the pilot valve 26 and the pilot valve seat 27 increases, the first contact surface 32 comes into plane-contact with the second contact surface 33 with the deformation of the resin of the first contact surface 32, so that the high durability of the contact surface may be maintained.

Furthermore, in this embodiment, the first contact surface 32 is formed of a resin, and the second contact surface 33 is formed of metal. However, the first contact surface 32 may be formed of metal, and the second contact surface 33 may be formed of a resin.

Further, here, a case has been described in which the opening and closing valve for high-pressure gas according to the invention is applied to the portion of the pilot valve seat 27 and the pilot valve 26 of the main stop valve 10. However, the opening and closing valve for high-pressure gas according to the invention may be applied to the portion of the main valve seat 16 and the main valve 15 of the main stop valve 10. In this case, it is desirable that the respective portions of the main valve 15 and the main valve seat 16 be set according to the following ranges.

For example,

Diameter of end portion near main valve seat 16 of discharge path 13→3 mm to 8 mm Conical angle of valve head portion 17 of main valve 15→60° to 120°

Curvature radius of circular-arc cross-section of main valve seat 16→0.1 mm to 0.5 mm Subsequently, a second embodiment shown in FIGS. 7 to 10 will be described. In this embodiment, the opening and closing valve for high-pressure gas according to the invention is applied to the pressure reducing valve 5 of the fuel cell system shown in FIG. 1.

Figure 7:
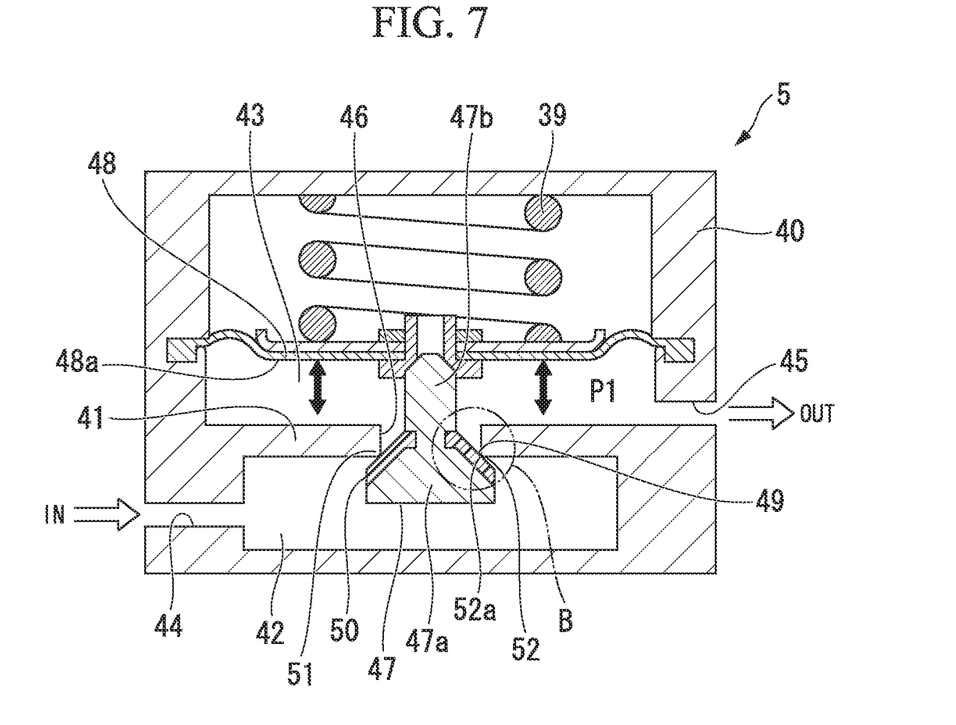
FIG. 7 is a longitudinal cross-sectional view illustrating a pressure reducing valve according to a second embodiment of the invention.
Figure 8:
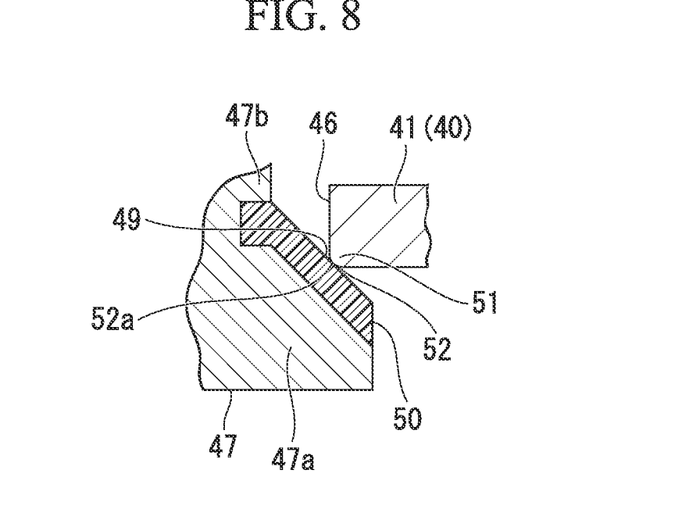
FIG. 8 is an enlarged cross-sectional view illustrating a part B of FIG. 7.
Figure 9:
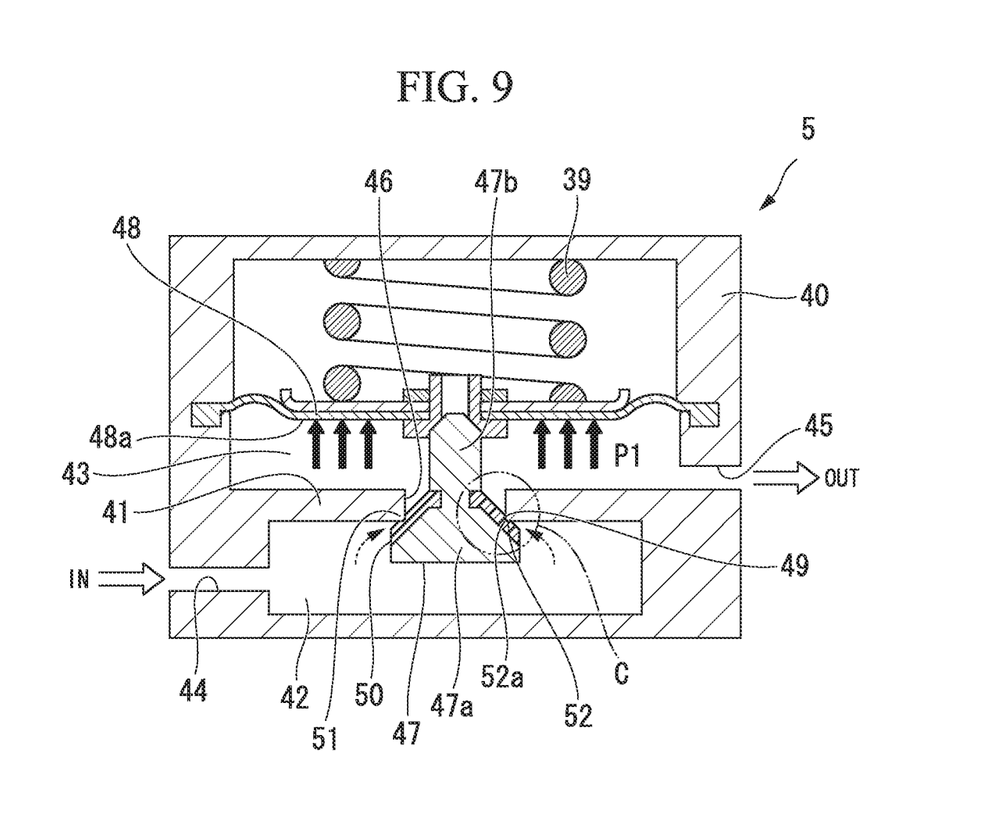
FIG. 9 is a longitudinal cross-sectional view illustrating a pressure reducing valve according to the second embodiment of the invention.
Figure 10:
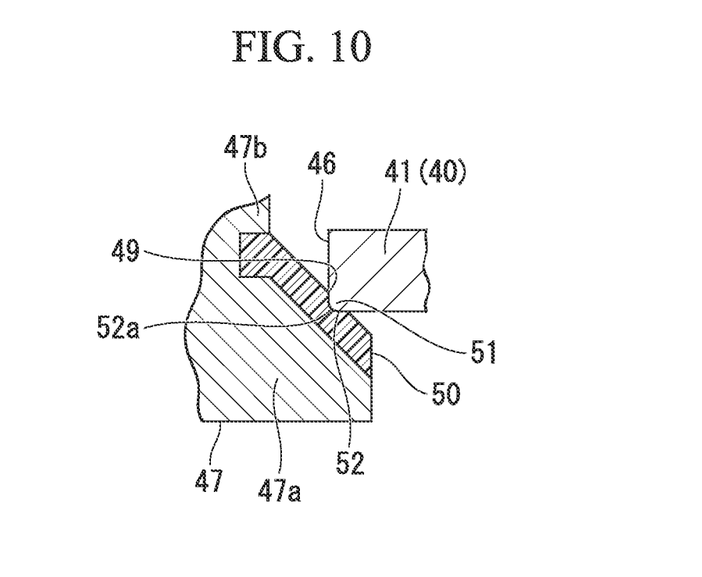
FIG. 10 is an enlarged cross-sectional view illustrating a part C of FIG. 9.

FIGS. 7 and 9 are diagrams illustrating a detailed structure of the pressure reducing valve 5, and FIGS. 8 and 10 are diagrams respectively magnifying parts B and C of FIGS. 7 and 9.

As shown in these drawings, in the pressure reducing valve 5, a primary pressure chamber 42 (a first gas passageway) and a secondary pressure chamber 43 (a second gas passageway) are provided with a partition wall 41 interposed therebetween inside a valve housing 40. The primary pressure chamber 42 is connected to the upstream side of the hydrogen supply passageway 3 (the side of the hydrogen tank 2) through an inflow port 44 of the valve housing 40, and the secondary pressure chamber 43 is connected to the downstream side of the hydrogen supply passageway 3 (the side of the pressure receiving device 7) through an outflow port 45 of the valve housing 40.

The partition wall 41 is provided with a communication hole 46 which communicates with the primary pressure chamber 42 and the secondary pressure chamber 43, and the communication hole 46 is opened and closed from the side of the primary pressure chamber 42 by a valve body 47 to be described later.

Further, a diaphragm 48 is installed inside the valve housing 40 so as to be disposed in the secondary pressure chamber 43. The surface of the diaphragm 48 which is disposed in the secondary pressure chamber 43 serves as a pressure receiving surface 48a, and the space portion on the rear surface side of the pressure receiving surface 48a is connected to the atmosphere. A valve shaft 47b of the valve body 47 which penetrates the communication hole 46 of the partition wall 41 is connected to the center portion of the diaphragm 48. The valve body 47 includes the valve shaft 47b which penetrates the inside of the communication hole 46 and a valve head portion 47a which extends to the end portion of the valve shaft 47b and opens and closes the end portion of the communication hole 46 on the side of the primary pressure chamber 42. Further, the rear surface side of the diaphragm 48 is provided with a spring 39 which biases the diaphragm 48 in a direction in which the valve body 47 opens the communication hole 46.

The biasing force of the spring 39 and the pressure in the secondary pressure chamber 43 are exerted in the diaphragm 48. For this reason, when the pressure in the secondary pressure chamber 43 decreases so as to be a predetermined pressure or less due to the consumption (flow) of the hydrogen gas in the pressure receiving device 7, the valve head portion 47a of the valve body 47 opens the communication hole 46, so that a high-pressure hydrogen gas flows from the primary pressure chamber 42 into the secondary pressure chamber 43 in a depressurized state.

Further, as shown in FIGS. 8 and 10, the valve body 47 is formed so that the valve head portion 47a protrudes toward the valve shaft 47b in a conical shape. The conical surface of the valve head portion 47a forms a first contact surface 49, and is formed by attaching a surface material 50 which is formed of a resin with elasticity to a metallic base surface. It is desirable that the resin which forms the surface material 50 have elasticity and high durability with respect to the pressure-contact load. For example, polyamide-imide or the like is used.

On the other hand, the edge portion of the communication hole 46 on the side of the primary pressure chamber 42 is formed as a valve seat 51 where the valve head portion 47a of the valve body 47 comes into contact and separates. The entire valve seat 51 is formed of metal. Further, the valve body 47 is disposed so as to be coaxial with the valve seat 51.

In the valve seat 51, the corner of the end portion of the communication hole 46 is chamfered in a circular-arc shape along the circumferential direction, and the portion is formed as a circular-arc cross-section 52a. In this embodiment, the portion of the circular-arc cross-section 52a and the inner and outer edge portions are formed as a second contact surface 52. When the second contact surface 52 first comes into contact with the first contact surface 49 on the side of the valve body 51, as shown in FIG. 8, the portion of the circular-arc cross-section 52a comes into line-contact with the first contact surface 49. When the pressure-contact load increases from this state, as shown in FIG. 10, the portion comes into plane-contact with the first contact surface 49 by the elastic deformation of the first contact surface 49 formed of a resin. At this time, the valve head portion 47a of the valve body 47 is inserted into the communication hole 46, so that the contact area with respect to the valve seat 51 increases.

Furthermore, it is desirable that the respective portions of the valve body 47 and the respective portions of the valve seat 51 be set according to the following ranges.

For example,

Diameter of communication hole 46→3 mm to 8 mm

Conical angle of valve head portion 47a of valve body 47→60° to 120°

Curvature radius of circular-arc cross-section 52a of valve seat 51→0.1 mm to 0.5 mm Incidentally, in the case of the pressure reducing valve 5, the area S ($mm^2$) of the pressure receiving surface 48a of the diaphragm 48 and the spring constant k (N/mm) of the spring 39 are set so as to satisfy the following equations (1) and (2).

$$P1 \times S - k \times \Delta L > C \qquad (1)$$

$$P1 < P2 \qquad (2)$$

Here, P1 denotes the pressure (MPa or $N/mm^2$) of the secondary pressure chamber 43 when the valve body 47 closes the communication hole 46, $\Delta L$ denotes the displacement (mm) from the free length of the spring 39, C denotes a minimum closing load (N) of the valve body 47, and P2 denotes the allowable maximum pressure (MPa or $N/mm^2$) of the pressure receiving device 7.

With such a setting, in the pressure reducing valve 5, when the flow of the hydrogen gas stops at the pressure receiving device 7 with the stopping of the operation of the pressure receiving device 7, at first, the thrust force (P1×S) in the valve closing direction caused by the pressure P1 of the secondary pressure chamber 43 acting on the diaphragm 48 is equal to the thrust force (k×$\Delta L$) in the valve opening direction caused by the spring 39, so that the valve body 47 comes slightly into contact with the valve seat 51 as shown in FIGS. 7 and 8.

In this state, since the press-contact force between the valve body 47 and the valve seat 51 is weak, the high-pressure hydrogen gas of the primary pressure chamber 42 leaks slightly to the secondary pressure chamber 43 from the gap between the valve body 47 and the valve seat 51 with the elapse of time, so that the pressure P1 of the passageway of the pressure receiving device 7 and the secondary pressure chamber 43 slightly increases. In this way, when the pressure P1 of the secondary pressure chamber 43 increases up to a predetermined pressure, a difference between the thrust force (P1×S) in the valve closing direction caused by the pressure P1 of the secondary pressure chamber 43 acting on the diaphragm 48 and the thrust force (k×$\Delta L$) in the valve opening direction caused by the spring 39 reaches the minimum closing load C of the valve body 47. Then, as shown in FIGS. 9 and 10, the gap between the valve body 47 and the valve seat 51 is sealed, and the gap between the primary pressure chamber 42 and the secondary pressure chamber 43 is completely isolated. At this time, the first contact surface 49 on the side of the valve body 47 and the second contact surface 52 on the side of the valve seat 51 come into plane-contact with each other by the elastic deformation of the first contact surface 49 as described above.

Furthermore, since the pressure P1 of the secondary pressure chamber 43 at this time is set to a range which does not reach the allowable maximum pressure of the pressure receiving device 7 as shown in the equation (2), even when the valve is continuously closed, the pressure receiving device 7 is not adversely affected by the pressure P1 of the gas.

As described above, in the pressure reducing valve 5 of the embodiment, the valve body 47 and the valve seat 51 come into contact with each other at the conical first contact surface 49 and the second contact surface 52 with a circular-arc cross-section 52a, the first contact surface 49 is formed of a resin with elasticity, and the second contact surface 52 is formed of metal. Accordingly, in a state where the thrust force in the valve closing direction is small, the first contact surface 49 and the second contact surface 52 come into line-contact with each other so as to close the valve. When the thrust force in the valve closing direction increases, the first contact surface 49 and the second contact surface 52 may come into plane-contact with each other by the deformation of a resin.

Accordingly, in the pressure reducing valve 5, since the gap between the valve body 47 and the valve seat 51b may be sealed by the line-contact portion from a stage where the thrust force in the valve closing direction acting on the diaphragm 48 is comparatively small, it is possible to avoid an excessive increase in the pressure receiving area of the diaphragm 48 and realize a decrease in the size of the device. Further, when the thrust force in the valve closing direction acting on the diaphragm 48 increases, the valve body 47 and the valve seat 51 come into plane-contact with each other, so that the high durability of the contact surface of the valve body 47 or the valve seat 51 may be maintained.

Figure 11:
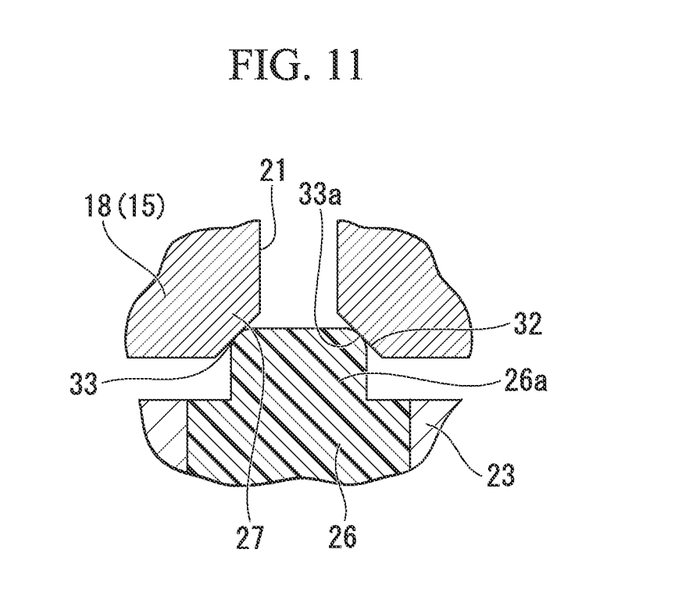
FIG. 11 is an enlarged cross-sectional view illustrating to a modification of the part A of FIG. 2.
Figure 12:
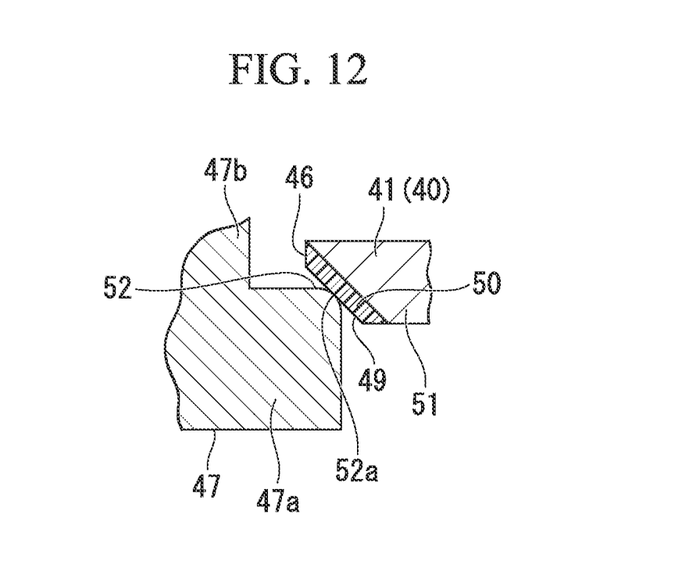
FIG. 12 is an enlarged cross-sectional view illustrating a modification of the part B of FIG. 7.
Figure 13A:
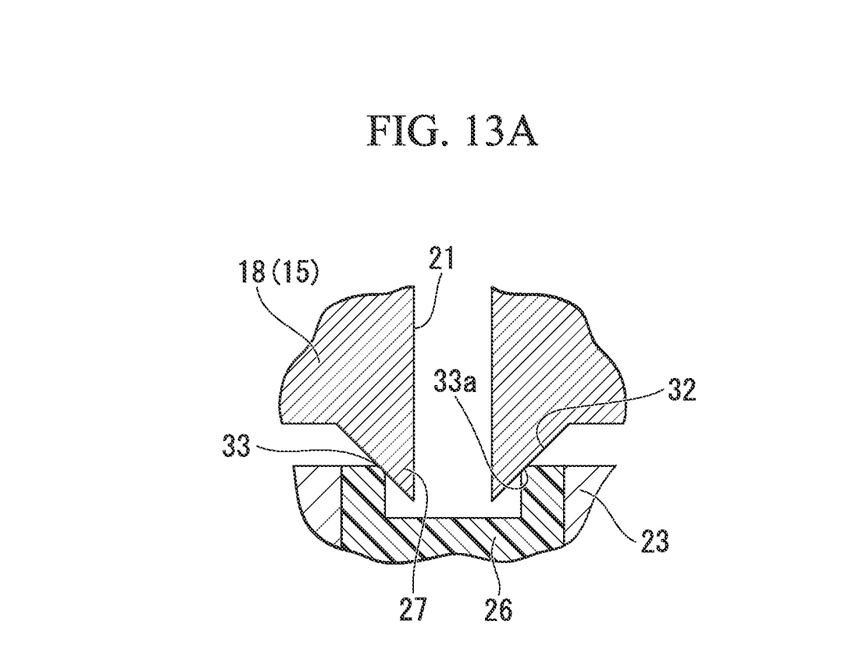
FIG. 13A is an enlarged cross-sectional view illustrating to other modification of the part A of FIG. 2.
Figure 13B:
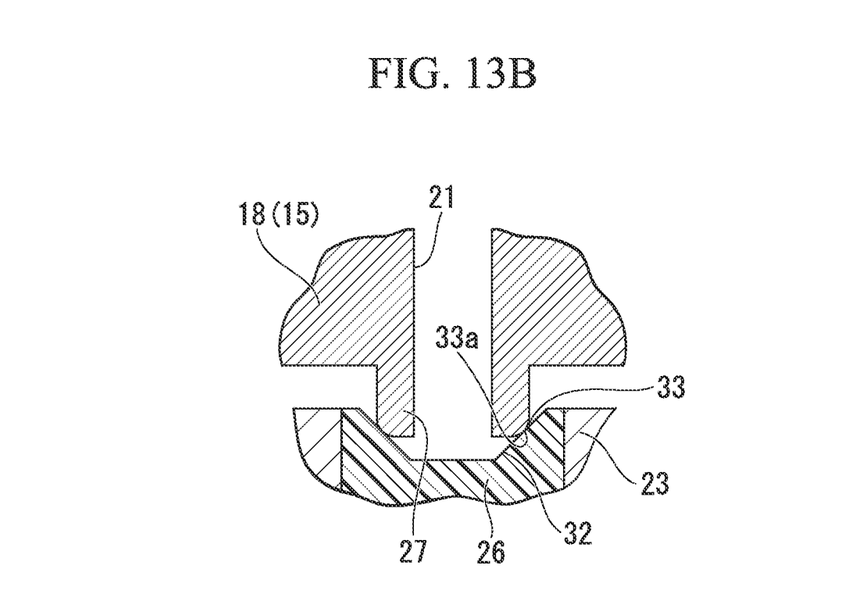
FIG. 13B is an enlarged cross-sectional view illustrating to other modification of the part A of FIG. 2.
Figure 14A:
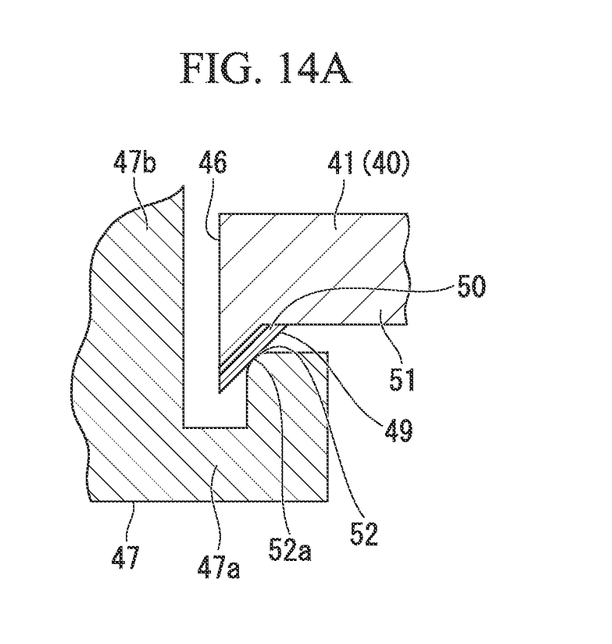
FIG. 14A is an enlarged cross-sectional view illustrating other modification of the part B of FIG. 7.
Figure 14B:
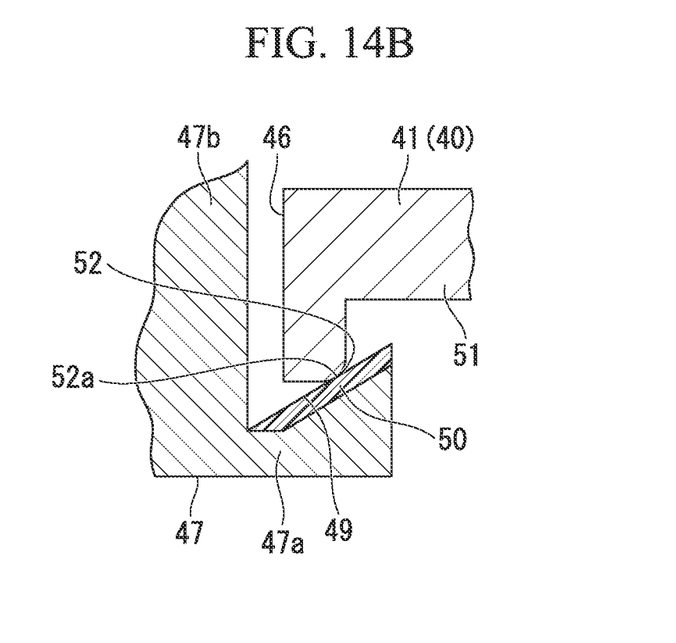
FIG. 14B is an enlarged cross-sectional view illustrating other modification of the part B of FIG. 7.

Furthermore, the invention is not limited to the above-described embodiments, and various modifications in design may be made without departing from the spirit of the invention. For example, in the above-described respective embodiments, the conical first contact surface is provided in the valve body, and the second contact surface having a circular-arc cross-section is provided in the valve seat. However, as shown in FIGS. 11 and 12, the conical first contact surface may be provided in the valve seat, and the second contact surface having a circular-arc cross-section may be provided in the valve body. Further, as shown in FIGS. 13A, 13B, 14A, and 14B, the inclined direction of the conical shape may be opposite to that of FIGS. 3, 8, 11, and 12.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An apparatus, comprising:
an opening and closing valve configured to communicate high-pressure hydrogen gas that opens and closes a passageway by causing a valve body and a valve seat, which are coaxially disposed, to come into contact with or separate from each other,
wherein the valve body includes a conical first contact surface and is biased by a biasing member, and the valve seat includes an annular second contact surface of which an initial contact portion with respect to the conical first contact surface has a circular-arc cross-section,
wherein one of the conical first contact surface and the annular second contact surface is formed of polyamide-imide, and the other thereof is formed of metal,
wherein the passageway comprises a diameter ranging from 3 to 8 millimeters,
wherein the conical first contact surface comprises a conical angle ranging from 60° to 120°, and
wherein the circular-arc cross-section comprises a curvature radius ranging from 0.1 to 0.5 millimeters.

2. The apparatus according to claim 1,
wherein when the valve body and the valve seat come into contact with each other, an area from the contact area to the valve body is connected to a first gas passageway and an area from the contact area to the valve seat is connected to a second gas passageway.

3. An apparatus, comprising:
an opening and closing valve configured to communicate high-pressure hydrogen gas that opens and closes a passageway by causing a valve body and a valve seat, which are coaxially disposed, to come into contact with or separate from each other,
wherein the valve seat includes a conical first contact surface and the valve body includes an annular second contact surface biased by a biasing member, and the annular second contact surface includes an initial contact portion with respect to the conical first contact surface, the initial contact portion having a circular-arc cross-section,
wherein one of the conical first contact surface and the annular second contact surface is formed of polyamide-imide, and the other thereof is formed of metal,
wherein the passageway comprises a diameter ranging from 3 to 8 millimeters,
wherein the conical first contact surface comprises a conical angle ranging from 60° to 120°, and
wherein the circular-arc cross-section comprises a curvature radius ranging from 0.1 to 0.5 millimeters.

4. The apparatus according to claim 3,
wherein when the valve body and the valve seat come into contact with each other, an area from the contact area to the valve body is connected to a first gas passageway and an area from the contact area to the valve seat is connected to a second gas passageway.

* * * * *